June 10, 1930.   D. F. BEAUCHAMP   1,763,550
ADJUSTABLE REFLECTOR
Filed Dec. 21, 1926   2 Sheets-Sheet 1
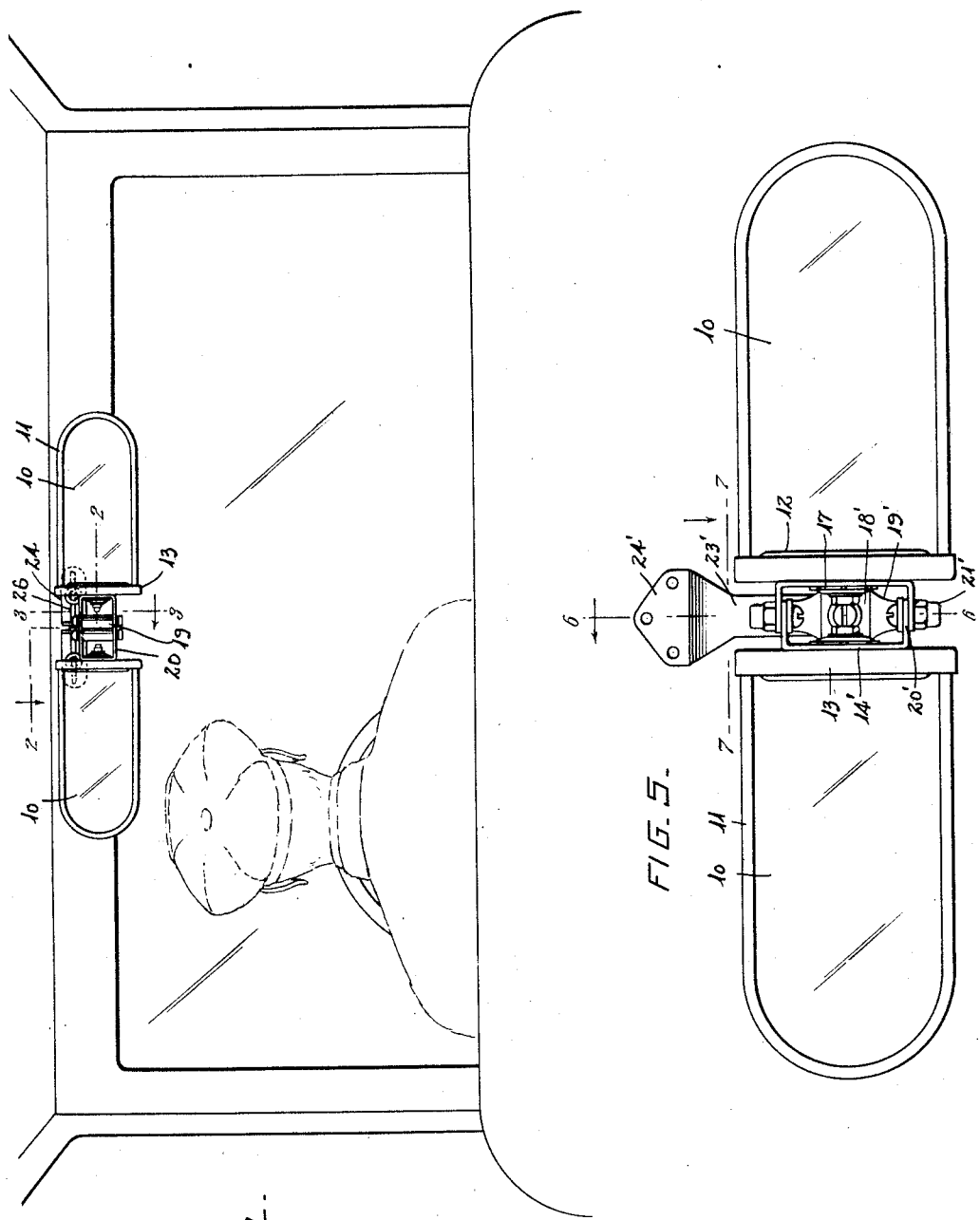
Inventor:
Dora F. Beauchamp
By Monroe C. Miller
Attorney June 10, 1930.                D. F. BEAUCHAMP                1,763,550
                            ADJUSTABLE REFLECTOR
                            Filed Dec. 21, 1926         2 Sheets-Sheet 2
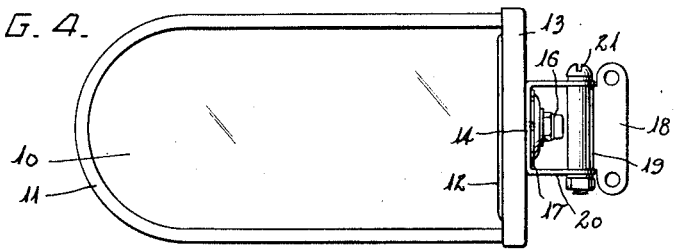
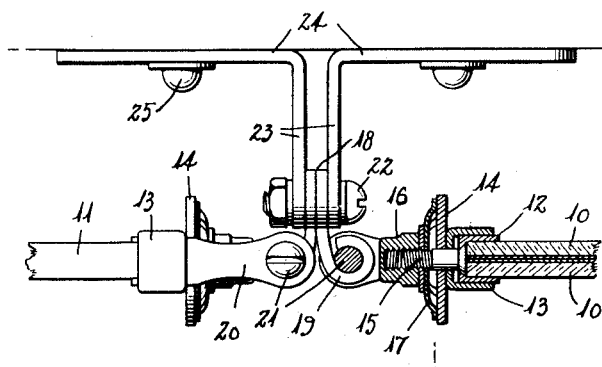
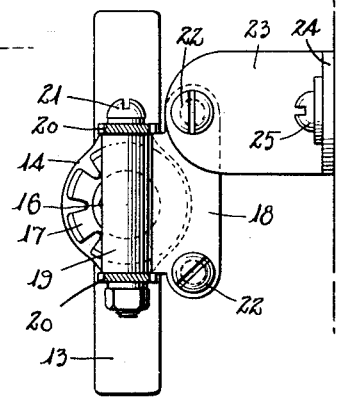
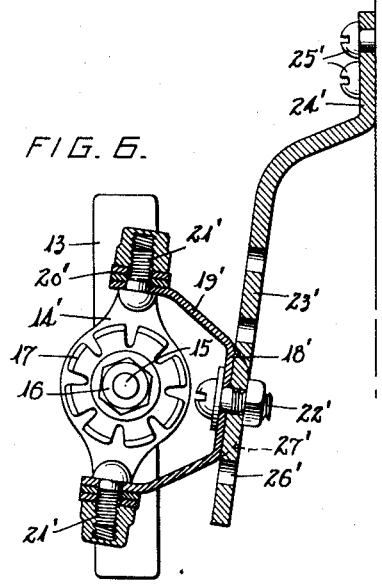
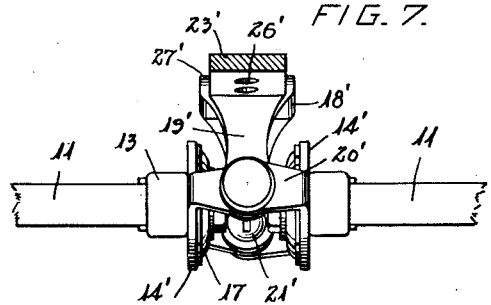
Inventor:
Dora F. Beauchamp
By Monroe E. Miller
Attorney.

Patented June 10, 1930

1,763,550

UNITED STATES PATENT OFFICE

DORA FAURE BEAUCHAMP, OF FOREST HILLS, NEW YORK

ADJUSTABLE REFLECTOR

Application filed December 21, 1926. Serial No. 156,119.

The present invention relates to adjustable reflectors, especially those intended to be used for rear sight mirrors for automobiles and other vehicles, and this device is an improvement over the adjustable reflectors disclosed in my Patent No. 1,578,629, granted March 30, 1926, and in my copending application Serial No. 87,110, filed February 9, 1926 (now Patent No. 1,628,218, granted May 10, 1927).

One object of the invention is to provide novel means for mounting a rear sight mirror or reflector in front of the operator of an automobile or other vehicle, or for any other purpose, in order that the mirror may be adjusted to different positions and angles, so that the operator of the vehicle or observer can conveniently observe other vehicles or objects in rear.

Another object is the provision of novel means for mounting a pair of mirrors or reflectors, with the reflectors extending in opposite directions and capable of individual adjustment to different positions and angles.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a face view of the device as used within a closed automobile.

Figs. 2 and 3 are enlarged sections on the respective lines 2—2 and 3—3 of Fig. 1.

Fig. 4 is a front view of one of the reflector units by itself for use as a single unit.

Fig. 5 is a front view of a modified construction of double reflector mounting.

Figs. 6 and 7 are sections on the respective lines 6—6 and 7—7 of Fig. 5.

The device shown in Figs. 1, 2 and 3 is composed of two units of the kind shown in Fig. 4, and each unit comprises a reflector or mirror which is reversible, having opposite mirror or reflecting surfaces. The reflector proper comprises the opposite panels or plates 10 of glass or other transparent material disposed back to back, with their inner surfaces coated with silver, mercury or other material to provide the reflecting surfaces. One panel or plate has a highly polished or brilliant reflecting surface, while the other panel has a dull or subdued reflecting surface to be used to avoid glare from strong sunlight or headlights, the inner surface of the panel being painted black.

The panels 10 are disposed within a metal frame comprising the U-shaped member 11 of channel-shaped cross section fitting astride the edges and the rounded end of the panels; a channel shaped end member 12 fitting astride the opposite end of the panels and held in place by the ends of the member 11; and an elongated cap 13 fitted over the member 12 and ends of the member 11 to hold said members assembled. The members 11 and 12 and cap 13 are assembled in substantially the same manner as disclosed in my copending application Serial No. 87,110 supra.

Plates 14 extend across and bear against the caps 13 of the two reflectors, and pivot bolts 15 have countersunk heads seated within the frame members 12 and extend through the caps 13 and plates 14 to pivotally connect the reflectors with said plates in order that the reflectors may be rotated about their longitudinal axes. Nuts 16 are threaded on the protruding terminals of the bolts 15 for clamping the caps 13 and plates 14 together in order to maintain the adjustment of the reflectors, and spring washers 17 are disposed between the plates 14 and nuts 16 in order to create spring tension for frictionally holding the caps 13 and plates 14 in tight engagement.

A plate 18 is provided for each reflector unit and has a portion bent back to form a sleeve 19, and the plate 14 has arms 20 extending at an angle therefrom and overlapping the opposite ends of the corresponding sleeve 19. The plate 14 is thus of U-shape, with the reflector pivotally connected to the intermediate or yoke portion thereof, and the arms 20 are hingedly connected with the plate 18, a hinge bolt or pin 21 extending through the arms 20 and sleeve 19. This permits the plate 14 and reflector carried thereby to be swung about the axis of the hinge bolt 21 which is at right angles to the axis of the pivot bolt 15.

The units as described up to this point may be used individually, for example, as shown in Fig. 4, by fastening the plate 18 to a suitable support, and when the bolt 21 is loosened the plate 14 and reflector may be adjusted about the axis of said bolt, and the reflector may also be turned about the axis of the bolt 15, thereby enabling the reflector to be positioned at different angles and to be reversed for presenting either the brilliant or the subdued reflecting panel into use.

The pair of reflector units may be conveniently assembled for use as shown in Fig. 1, with the reflectors extending in opposite directions from the central mounting. Thus, the plates 18 are disposed back to back and are clamped together by means of bolts 22, thereby conveniently assembling the two units. One of the bolts 22 is employed for pivotally mounting the plates 18 between the ears 23 extending angularly from attaching plates 24 which are fastened by means of screws 25 or other securing elements to a supporting member of the automobile or other object, and said plates 24 have slots 26 to permit the plates to be adjusted longitudinally. The plates 18 are clamped between the ears 23 by the corresponding bolt 22 which extends through said ears, and when said bolt is loosened the plates 18 and reflectors carried thereby may be adjusted about the axis of the pivot bolt 22. Thus, although the two reflector units are assembled as a single device, each reflector may be adjusted and positioned independently of the other about the axes of the bolts 15 and 21, and both reflectors may be adjusted with the plates 18 and 24.

In the modified structure shown in Figs. 5, 6 and 7, the attaching plate 24' which is fastened by screws 25' or otherwise to the support has an offset arm 23' which may be positioned to extend downwardly or in any other desired direction, and an adjustable member 18' has its intermediate portion bearing against the arm 23' and is provided with arms 19' which are overlapped by the arms 20' of the plates 14'. Hinge bolts 21' extend through the arms 19' and 20', to hingedly connect the plates 14' with the plate or member 18', and a bolt 22' clamps the member 18' to the arm 23', said arm having a series of apertures 26' to receive the bolt 22' for adjusting the reflector units to different positions. The member or plate 18' has flanges 27' overlapping the edges of the arm 23' to prevent said member from rotating on the bolt 22'.

The parts or members 11, 12, 13, 14, 18, 24, 18' and 24' may be readily stamped from suitable sheet metal for the convenient and inexpensive manufacture of the devices.

Having thus described the invention, what is claimed as new is:—

1. A device of the character described comprising two reflectors extending away from one another, supporting means, and U-shaped members having their intermediate portions abutting and pivotally connected on horizontal axes with the adjacent ends of said reflectors and having their arms extending toward one another and hingedly connected on a vertical axis with said supporting means, the opposite ends of the reflectors being free.

2. A device of the character described comprising two separable reflector units each including a reflector, a plate having a vertical sleeve, a U-shaped member having its intermediate portion abutting and pivotally connected on a horizontal axis with one end of the reflector and having its arms overlapping the ends of said sleeve, and a vertical pivot element extending through said arms and sleeve, in combination with means for detachably clamping said plates together and supporting them.

3. A device of the character described comprising supporting means, members each hingedly connected on a vertical axis with said supporting means for independent adjustment and extending in opposite directions away from one another, and two reflectors extending away from one another and having their adjacent ends abutting and pivotally connected with said members on horizontal axes, the opposite ends of the reflectors being free.

In testimony whereof I hereunto affix my signature.

Mrs. DORA FAURE BEAUCHAMP.